United States Patent [19]
Droux

[11] 4,354,210
[45] Oct. 12, 1982

[54] MAGNETIC STORAGE MEDIUM

[75] Inventor: Jacques Droux, Montfermeil, France

[73] Assignee: Compagnie Internationale Pour l'Informatique CII-Honeywell Bull, Paris, France

[21] Appl. No.: 13,796

[22] Filed: Feb. 16, 1979

[30] Foreign Application Priority Data

Feb. 17, 1978 [FR] France .................. 78 04498

[51] Int. Cl.³ ........................... G11B 21/10
[52] U.S. Cl. ..................................... 360/77
[58] Field of Search .................... 360/42, 77, 78

[56] References Cited

U.S. PATENT DOCUMENTS 3,864,741 2/1975 Schwarz ........................ 360/77
4,151,571 4/1979 Cardot et al. .................. 360/77

FOREIGN PATENT DOCUMENTS 2346806 3/1976 France ........................ 360/77

OTHER PUBLICATIONS

"Servo Sector Method"-Deremer et al., IBM Tech. Dis. Bul., vol. 20, #8, Jan. 78.

Primary Examiner—Vincent P. Canney
Attorney, Agent, or Firm—Lowe, King, Price & Becker

[57] ABSTRACT

Binary bits on a magnetic storage medium are read by a magnetic head that moves at approximately constant speed relative to the medium. The medium includes several elongated adjacent magnetic tracks, each including a succession of longitudinally positioned polarized magnetic flux variations arranged in elemental areas of equal length along the length of each track. Adjacent areas are susceptible to having like and unlike magnetic flux polarizations. The head and tracks are positioned so the head straddles a pair of the tracks and is simultaneously responsive to flux variations in the straddled tracks. The head and track move relative to each other so the head is responsive to successive flux variations as time progresses. The areas are arranged so there is always a magnetic flux polarization transition at predetermined equi-spaced positions along the track length at a boundary between a pair of elemental areas. The transition direction at each boundary indicates a binary bit value. The fluxes of the elemental areas between adjacent boundaries selectively have different polarity variations to assure that like polarity transitions at each boundary represent like binary bit values.

13 Claims, 14 Drawing Figures

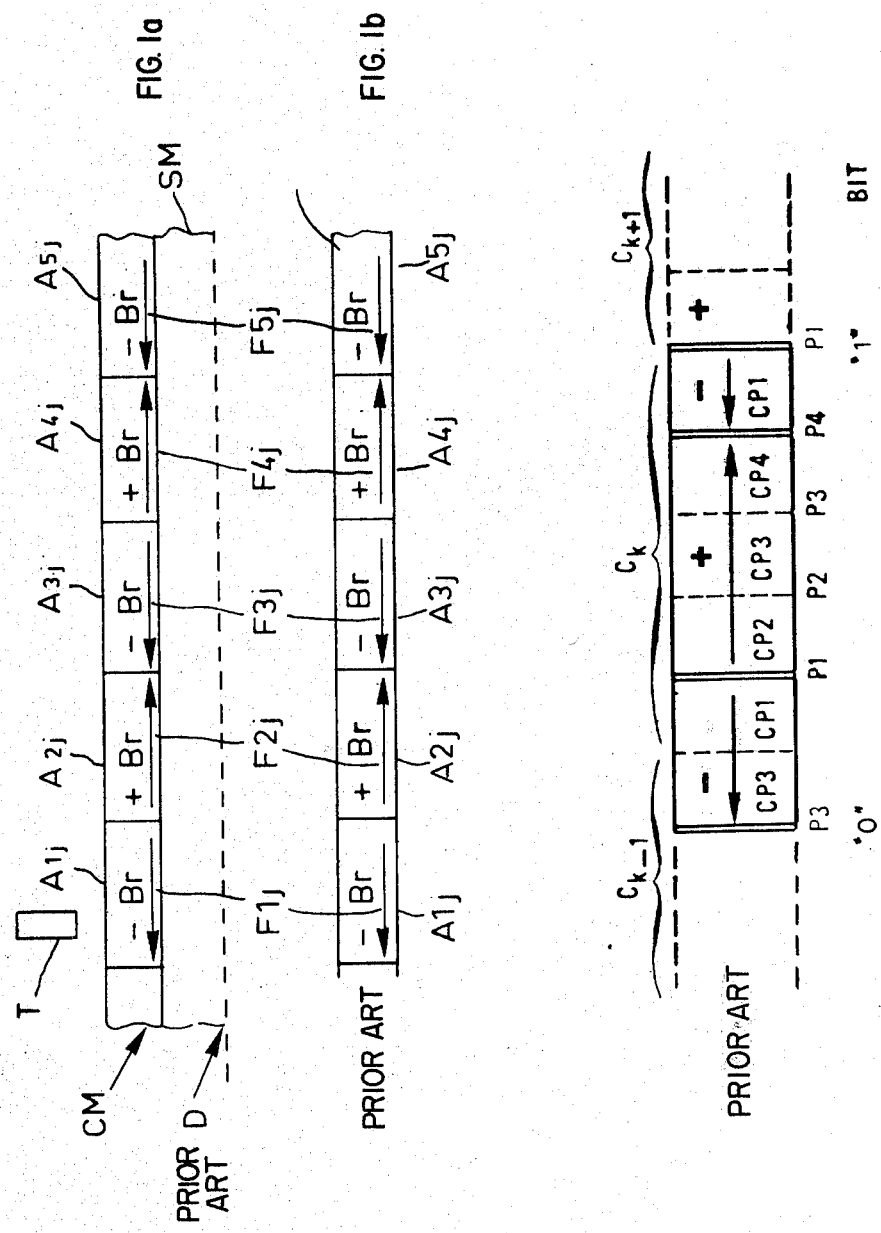

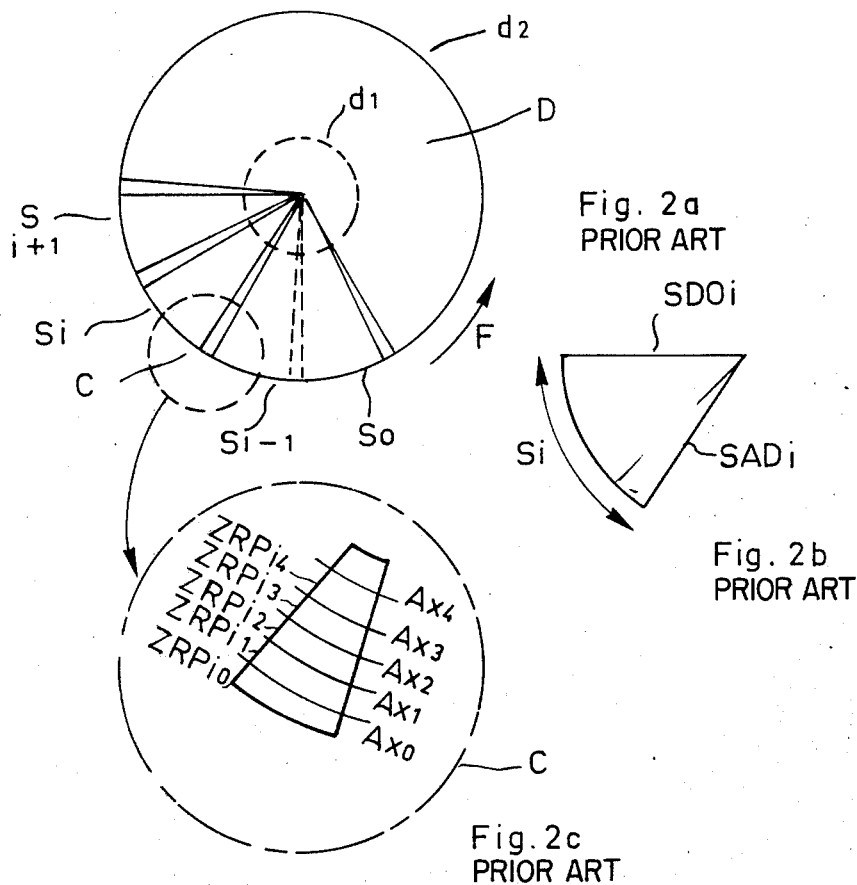
Fig. 2a PRIOR ART
Fig. 2b PRIOR ART
Fig. 2c PRIOR ART
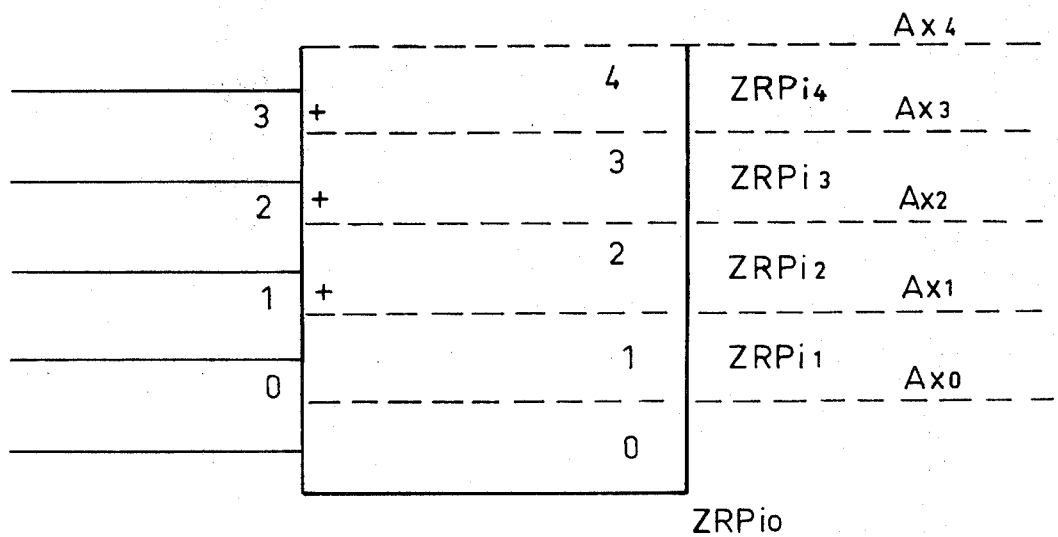
Fig. 2d PRIOR ART

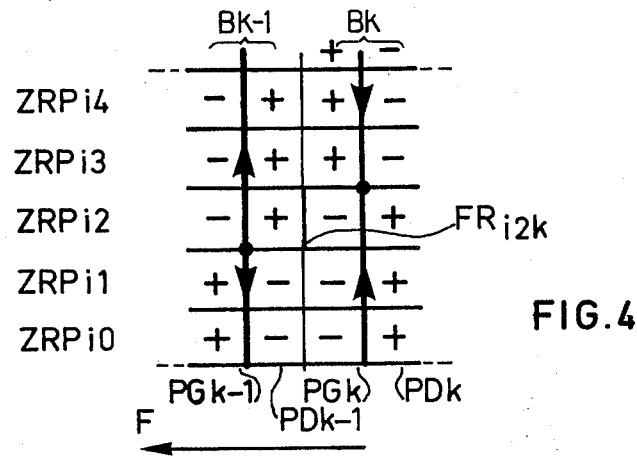
FIG.4
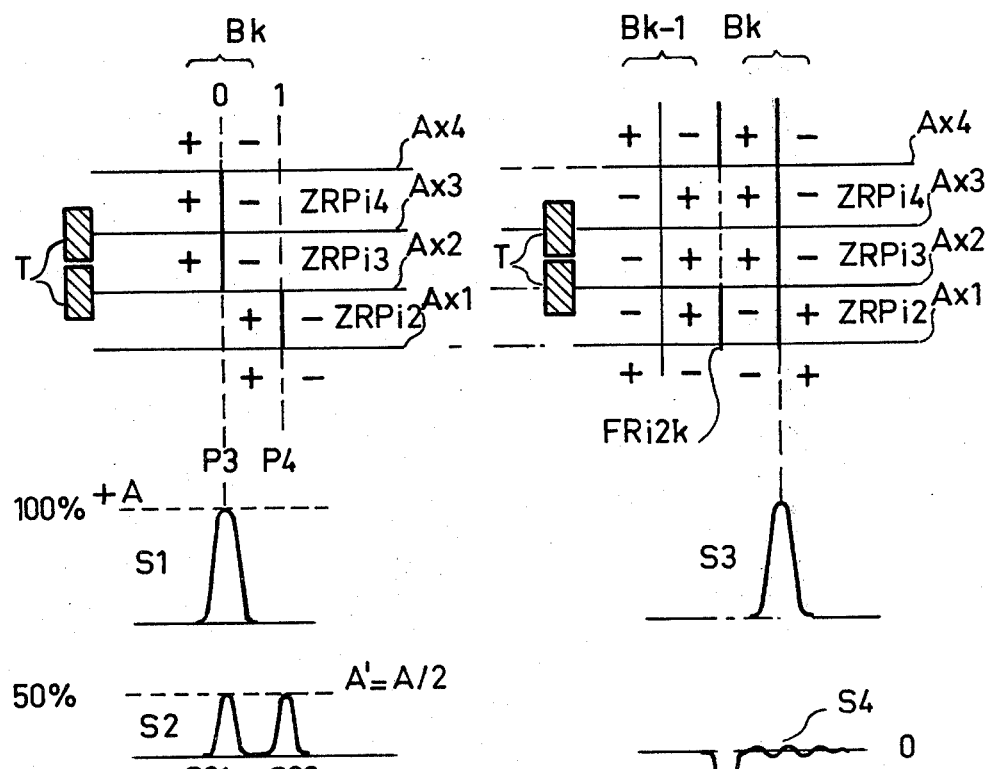
FIG.5a PRIOR ART
FIG.5b

MAGNETIC STORAGE MEDIUM

TECHNICAL FIELD

The present invention relates to a magnetic recording medium and more particularly to a medium wherein an adjusting magnetic flux change is selectively provided between a pair of data indicating magnetic flux changes.

BACKGROUND ART

In data processing systems, magnetic disc memory systems are frequently used because they have large storage capacity and require a relatively short time for a magnetic read/write head to access data contained anywhere on discs of the memory from the moment the head receives an instruction to access the data. The magnetic discs are driven at constant rotational velocity by an electric motor.

A magnetic disc carries coded data usually in binary form, on both faces of the disc in concentric circular recording tracks having a width that does not exceed a few hundredths of a millimeter. The tracks are identified by allotting them an address or serial number j (j being a whole number) from 0 to (N−1), where N is the total number of recording tracks. The tracks having addresses (j−1) and (j+1) are adjacent tracks to track j.

Memories having a small storage capacity contain a limited number of discs (normally only one or two). In small memories, data are stored, i.e., recorded, on each of the faces of the discs by setting a large amount of space aside for the data intended to be processed by the data processing system of which the memories are a part. A small amount of space is set aside for data that enables the tracks to be located; these data indicate the track addresses and enable the magnetic head to be servo controlled to a position above the tracks. In the small area are also stored data which indicate whether or not the tracks contain faults.

For the sake of simplicity, a memory is considered which contains only a single disc. Preferably, each face of the disc is associated with a single magnetic read/write head, i.e. a magnetic read/write transducer. Current practice, as described in commonly assigned U.S. Patent application Ser. No. 765,058 filed on Feb. 2, 1977 entitled "Method of Writing Addresses on a Magnetic Recording Medium", now U.S. Pat. No. 4,151,571, issued Apr. 24, 1979, is for the data contained on each face of the disc to be distributed over equal adjacent circular sectors $S_0, S_1 \ldots S_i \ldots S_n$. Generally, one face of a disc is divided into several tens of sectors (usually 40 to 50).

When the magnetic disc face associated with the magnetic head passes in front of the head, sectors $S_0, S_1, S_2$ etcetera are read by the head in sequence. It is therefore said that sector $S_0$ precedes sector $S_1$, that sector $S_1$ precedes sector $S_2$, that sector $S_i$ precedes sector $S_{i+1}$, and so on. In more general terms, if two items of information $B_{k-1}$ and $B_k$ which follow one another along the same track j on the face are considered, item $B_{k-1}$ precedes item $B_k$ if item $B_{k-1}$ is read by the head before $B_k$, or that item $B_k$ follows item $B_{k-1}$.

Each sector $S_i$ is divided into two unequal areas. The larger area contains the data to be processed by the data processing system of which the disc memory is a part, while the smaller area contains data for locating the tracks and indicating faults. For the sake of simplicity, the data contained in the larger area is referred to as "data to be processed". In each sector, the smaller area is divided into a plurality of reference zones, one for each track so each track is associated with a single reference zone.

It is recalled that a bit is a binary 1 or 0 digit. The 1 or 0 may be expressed on a magnetic medium or as an analog or logic electrical signal. A logic signal is capable of assuming only two values called "logic or binary zero" and "logic or binary one"; an analog signal is a signal having a voltage that may vary continuously between two positive and/or negative extreme values. Any item of data or information recorded on the disc is referred to herein as a "bit".

To record a series of data items on a magnetic disc, a succession of small magnetic domains termed "elementary magnets" are formed on each track. These domains are distributed along the entire length of the track and have magnetic inductions with the same modulus and of successively opposing senses in a direction parallel to the surface of the disc. A data bit is represented by a change in the sense of magnetic induction, also termed a magnetization sense change. There are two different types of sense changes, namely:

when the magnetic head passes successive elementary magnets having negative and positive induction on the disc, the magnetization sense change is positive; and when, on the other hand, the head passes successive elementary magnets having positive and negative induction, the magnetization sense change is negative.

The address of a track contains a number (p) of bits such that $2^p$ is less than or equal to the number of tracks n. Each reference zone in sector $S_i$, associated with a track having an address j, contains n cells (n being a whole number) $C_1, C_2 \ldots C_k \ldots C_n$. The cells are preferably arranged so each of a number (p) of cells contains two bits; one bit represents a portion of position control information, while the second bit represents a portion of the address for the track of serial number j. Another type of cell contains two fault-indicating bits which indicate whether a portion of track j within sector $S_{i+1}$ (following sector $S_i$) does or does not contain faults. The cells are described in further detail in the commonly assigned U.S. application entitled "Method of Writing Information Relating to Faults in a Magnetic Recording Medium" filed as Ser. No. 835,402 on Sept. 21, 1977, now U.S. Pat. No. 4,152,695, issued May 1, 1979.

The two magnetization sense changes which correspond to the two bits of each cell are of the same kind. Each change can occupy one of only two predetermined positions in the cell. The value of the bit represented by the change depends upon the position which the change occupies, as described in above mentioned U.S. Pat. No. 4,151,571. Thus, if a cell in a reference zone containing track locating data is considered, the position-control bit corresponds to the first change while the track address bit for the zone is the second change. If the magnetization sense change corresponding to the address bit occupies a first position (the position first encountered by the magnetic read head when the face of the magnetic disc which is associated with the head passes in front of it) the bit is equal to 0. If the change in magnetization occupies the other of the two predetermined positions, termed the "second position", the bit is equal to 1. The same rules apply both to the position-control bits and to the fault indicating data.

When the magnetic head encounters a series of magnetization sense changes representing a reference zone, it emits a series of analog signals which are shaped into a series of logic pulses by shaping circuits. The beginning of a reference zone is indicated by a spacial pulse. As described in U.S. Pat. Nos. 4,151,571 and 4,152,695, the boundary between two reference zones of one and the same sector which correspond to two adjoining tracks having serial numbers j and (j+1) coincides with the circular axis of symmetry $Ax_j$ of magnetic of serial number j.

It is assumed that "data to be processed" recorded on a magnetic track of serial number j is read by the magnetic head associated with the face which carries this data only when the head is perfectly centered on the circular axis $(Ax_j)$ of symmetry of track j. Such an assumption enables the reading to take place with maximum accuracy because the magnetic head is centered in any sector $S_i$, on the boundary between two reference zones corresponding to tracks with addresses of j and (j+1). Thus, the reading from zones j and (j+1) occurs with the head positioned at the same radial position as when the head reads the data to be processed. Thereby, data are read from the two reference zones when the magnetic head is straddling them.

The head cannot move to the radial position in the reference zones from the radial position it occupies while reading the data to be processed because of:

(1) the high speed the disc moves past the head; and (2) the small length within each sector of the reference zone associated with track j in comparison with the length of the track portion containing the "data to be processed".

In conclusion, within the overall quantities of data items contained in sector $S_i$, the reference zones, as a whole, contain a sub-set of data items, each of which is defined by a magnetization sense change. The changes are recorded, i.e. stored, in a plurality of adjoining tracks which are read by a magnetic head straddling two adjoining tracks. The head straddling can cause the electrical output signal of the head to have one of two possible waveforms regardless of whether the head senses fault indicating or position controlling bits. The two waveforms can occur because two address bits at the same position in two reference zones which correspond to two adjoining tracks in the same sector $S_i$, are simultaneously read. Thus the bits of the $k^{th}$ cell in the two zones, one having address j and the other having track address (j+1) are read at the same time by the head.

The first waveform occurs when the two address bits have the same value, that is when the bits occupy the same predetermined position within their respective cells. In such an instance, the head output signal is a pulse having an amplitude A, which results from the superimposition of two pulses having an amplitude A'=A/2, where A is the amplitude of the pulse signal when intended data are read. The value of the two read bits is then determined in the manner described in U.S. Pat. No. 4,151,571. In particular, the position of the pulse is identified in time relative to a pulse which indicates the beginning of the above mentioned two reference zones.

The second waveform occurs when the two address bits have different values, that is when like numbered bits of zones j and (j+1) occupy two different predetermined positions. In such a case the head derives a waveform including two successive pulses, each of amplitude A' and corresponding to one of the two bits. The time interval (t) between the two pulses is equal to the ratio d/v, where d is the distance separating the two predetermined sense change positions and v is the rotary speed of the disc. In such a case the output signal emitted by the head is an "uncertainty signal" made up of two "uncertain bits". The value of each of the two bits may, for example, be determined in the manner described in the commonly assigned U.S. Pat. application Ser. No. 753,809 entitled "Methods of Shifting a System Which is Movable Relative to a Carrier for Recorded Information and Arrangements for Putting the Method Into Practice" now U.S. Pat. No. 4,166,970, issued Sept. 4, 1979. The prior art method of writing data in the reference zones of a magnetic disc has the following disadvantages:

(1) inaccurate centering of the head relative to the axis of the track and thus relative to the boundary between two adjoining reference zones, (2) variations in the distance between the head and the face of the disc which is associated with it, and (3) instantaneous variations in the disc speed cause considerable variation in the amplitude of the signal derived by the head so there is a likelihood that a signal which should be of the first type (having an amplitude A) is transformed into an uncertainty signal of the second type and vice versa. This gives rise to the risk of error in determining the value of the bits written in the reference zones.

DISCLOSURE OF INVENTION

The present invention enables these disadvantages to be virtually overcome by assigning some or all of the bits in each reference zone one and the same position regardless of the value thereof. The value of the bit is a function of the nature of the magnetization sense change, i.e. a change from positive to negative magnetic flux represents a first binary bit value (e.g. a binary one) while a flux change from negative to positive represents a second bit value (e.g. a binary zero). An additional magnetization sense change, termed an "adjusting change", may or may not be positioned between two bits which follow one another along the same track in the same zone. The presence of the adjusting change depends on whether or not the magnetization sense changes which correspond to these bits are or are not of the same nature and assures that like sense changes always represent the same binary bit values.

Thus, when two address bits in the same serial position of two adjoining reference zones in the same sector $S_i$ have the same value, the signal emitted by the head is a pulse of amplitude A. If, however, the bits have different values, the uncertainty signal is of virtually zero amplitude. As a result of this, the data writing method according to the invention makes it possible to eliminate any errors in determining the value of the bits in spite of reading faults by the head. Any confusion between the two types of signal is impossible because of the extreme difference in the amplitude of the signals derived from the head for the two conditions. The reading of data from a magnetic record of the invention is thus reliable and safe and is easier to put into practice than the prior art.

The present invention is utilized in a system where binary coded data are written on a plurality of tracks of a magnetic recording medium. The data contains at least one sub-set of data items, each of which is defined by a magnetization sense change. The changes are disposed along a plurality of adjoining tracks and are read by at least one magnetic transducer which is positioned to straddle two adjoining tracks. The particular invention is characterized in that the magnetization sense change which corresponds to each data item in the sub-set always occupies the same position in any track. The value of the data item is a function of the nature of the magnetization sense change which it represents. An "adjusting change" is either placed or not placed between two adjacent data items which follow one another along the same track within the sub-set. The presence of the adjusting change depends upon whether the magnetization sense change which correspond to the adjacent data items are or are not of the same nature.

The above and still further objects, features and advantages of the present invention will become apparent upon consideration of the following detailed description of several specific embodiments thereof, especially when taken in conjunction with the accompanying drawing.

BRIEF DESCRIPTION OF DRAWINGS

FIGS. 1a and 1b are simplified diagrams illustrating the method of writing data on a magnetic recording medium, such as a magnetic disc; FIG. 1a is a cross-sectional view taken along a track while FIG. 1b is a top view;

FIG. 2, consisting of a–d, is an illustration of distribution of data on the surface of a magnetic disc;

FIG. 3 is an illustration of a prior art distribution of magnetism representing data in a reference zone;

FIG. 4 is a general diagram indicating how data are written in a reference zone on a magnetic recording medium in accordance with the invention;

FIGS. 5a and 5b are illustrations showing the advantages of the data writing method according to the invention relative to the prior art data writing method;

BEST MODE FOR CARRYING OUT THE INVENTION

Figure 6A:
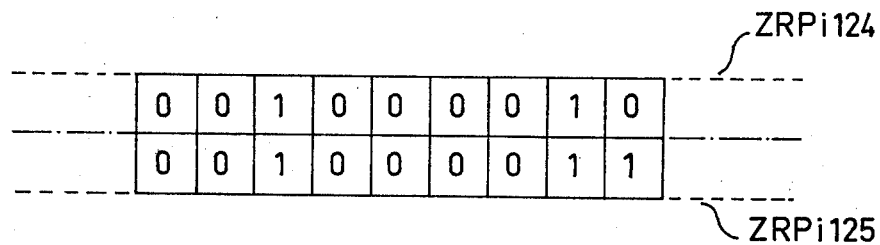
FIGS. 6a, 6b and 6c are illustrations of a preferred example of executing the data writing method according to the invention, wherein Grey coded addresses of two adjoining tracks having numbers j and j+1 are written in reference zones.

In order to provide a better understanding of how data are written in the reference zones of a magnetic recording medium in accordance with the invention, it is useful to review of few points illustrated by FIGS. 1, 2 and 3. In FIGS. 1 and 2 are illustrated the manner in which data is written on and distributed over the surface of a magnetic recording medium, preferably a magnetic disc; FIG. 3 is an illustration of a prior art distribution of data written in a reference zone. In FIGS. 1a and 1b is illustrated a portion (represented by a rectangle) of a data track having serial number j on a magnetic disc D forming part of a magnetic disc memory. The magnetic disc D comprises a non-magnetic metal carrier SM on which is deposited a thin layer of magnetic material CM. To magnetize magnetic material CM, the material is initially subjected to a magnetic field, H, generated by a magnetic read/write head. The strength of the field is sufficient to saturate material CM; that is the field strength has a sufficient value $H_s$ to cause material CM to reach a limiting value of magnetic induction, $B_s$. Magnetic field H is then reduced to zero. There then remains within material CM residual non-zero induction $B_r$, having a value dependent on the magnetic material used.

To write data along each track j on the disc D, a plurality of elementary magnets $A_{1j}$, $A_{2j}$, $A_{3j}$, $A_{4j}$, $A_{5j}$, etc. are established by a magnetic read/write head T. Magnetization poles $F_{1j}$ to $F_{5j}$, which define the direction and sense of the magnetic induction in elementary magnets $A_{1j}$ to $A_{5j}$, are parallel to carrier SM and successively of opposite senses. Thus, the sense of axis $F_{1j}$ is opposite from the sense of axis $F_{2j}$, the sense of axis $F_{2j}$ is opposite from the sense of axis $F_{3j}$, and so on. The value of the magnetic induction in elementary magnets $A_{1j}$ to $A_{5j}$ is equal to $(+B_r)$ or $(-B_r)$. If the value of the induction in magnet $A_{1j}$ is $(+B_r)$, the value of the induction in adjacent magnet $A_{2j}$ is $(-B_r)$ and so on. The length of elementary magnets $A_{1j}$ to $A_{sj}$ may vary.

Disc D, FIG. 2, rotates counterclockwise in the direction of arrow F and has a useful recording area bounded by inner and outer circles $d_1$ and $d_2$, respectively. On disc D are defined n equal and adjacent sectors $S_0$, $S_1$, ... $S_i$ ... $S_n$ of disc D. As seen in FIG. 2b, each sector $S_i$ is divided into two parts $SDO_i$ and $SAD_i$ having areas such that $SDO_i$ is much larger than $SAD_i$. In part $SDO_i$ are recorded data to be processed by a data processing system of which the disc memory is a part; in part $SAD_i$ are recorded track locating data (the addresses of the tracks and the data for controlling the position of the magnetic head T relative to the tracks) and data indicating whether or not any of the tracks in the adjoining sector $S_{i+1}$ contain faults.

FIGS. 2c and 2d are enlarged views of a portion of part $SAD_i$ contained in circle C, FIG. 2a. Each $SAD_i$ part of sector $S_i$ is divided into N zones $ZRP_{i0}$ ... $ZRP_{ij}$ ... $ZRP_{i(N-1)}$. For the sake of simplicity only the first five zones $ZRP_{i0}$ to $ZRP_{i4}$ are shown and are represented as rectangles. The boundaries between the various reference zones $ZRP_{ij}$, are the circular magnetic axes $Ax_j$ of the recording tracks of the magnetic disc D. In each sector $S_i$, a track having serial number j and circular axis $Ax_j$ is associated with a reference zone $ZRP_{ij}$. Thus, track 0 is associated with reference zone $ZRP_{i0}$, track 1 is associated with zone $ZRP_{i1}$ and so on.

In the prior art, each reference zone $ZRP_{ij}$ on a magnetic disc contains a plurality of equal length individual cells. The number of cells is at least equal to the number of bits required to write the addresses of the tracks (as is described in the above mentioned U.S. Pat. No. 4,151,571. An example of such an individual cell in a reference zone $ZRP_{ij}$ is shown in FIG. 3, wherein there are illustrated an exemplary complete cell $C_k$ and parts of the adjoining cells $C_{k-1}$ and $C_{k+1}$. Cell CK is divided into four equal length parts CP1, CP2, CP3, CP4 having boundaries defined at the positions P1, P2, P3, P4; position P1 is the boundary between parts CP1 and CP2, and so on. Each cell contains two successive changes (indicated by double lines) in the magnetization sense of the magnetic material layer. Also shown, for each cell, are the sense and polarity of the magnetic induction, i.e. flux, in each of parts CP1 to CP4. Each of the two changes in the magnetization sense can occupy two positions:

the "first change" can occupy either position P1 or position P2, the "second change" can occupy either position P3 or position P4. As seen in FIG. 3, magnetization sense changes which occupy the P1 or P3 position represent a binary zero bit, while changes occupying the P2 and P4 positions represent a binary one bit.

In other words, with prior art writing methods, the binary values of bits and data in reference zones $ZRP_{ij}$ are a function of the position occupied by the magnetization sense change within each cell in the zone. Also, regardless of the bit value, the magnetization sense change which corresponds to the bit value is always of the same polarity, for example from a negative to a positive polarity, indicated in FIG. 3 for the first change.

As represented in FIG. 4, in accordance with the invention, data are written in a reference zone $ZRP_{ij}$ on a magnetic recording medium by utilizing adjoining reference zones $ZRP_{i0}$ and $ZRP_{i4}$. Data are written in zones $ZRP_{i0}$ and $ZRP_{i4}$ by rotating the magnetic disc in the direction indicated by arrow F. Consider a pair of random data bits $B_k$ and $B_{k-1}$ in zones $ZRP_{i0}$ and $ZRP_{i4}$; bit $B_{k-1}$ preceding bit $B_k$. Bits $B_k$ and $B_{k-1}$ may be address bits, bits for controlling the position of head T, or fault indicating bits.

In accordance with the invention, the bit value is a function of the nature of the magnetization sense changes; i.e. the polarity transitions of magnetic flux in zone $ZRP_{ij}$; each bit always occupies the same position in reference zone $ZRP_{ij}$. In a preferred embodiment, if the magnetization sense change is positive, whereby the magnetic flux changes from negative to positive, the binary value is a one; if the magnetization sense change is negative, whereby the flux changes from positive to negative, the binary bit value is a zero. Obviously, the opposite coding could be adopted for the bit values, with a negative magnetization sense change corresponding to a one bit.

Depending upon the value of the preceding bit $B_{k-1}$, bit $B_k$ is selectively preceded, by an additional magnetization sense change $FR_{ijk}$ which is situated between bits $B_{k-1}$ and $B_k$; this additional change $FR_{ijk}$ being referred to as an "adjusting change". For example, in zone $ZRP_{i2}$ (FIG. 4) wherein bits $B_{k-1}$ and $B_k$ have the same value, an adjusting change $FR_{i2k}$ is required since the parts $PG_k$ and $PD_{k-1}$, respectively situated to the left of bit $B_k$ and to the right of bit $B_{k-1}$, have negative and positive values of magnetic induction. None of the other four zones $ZRP_{i0}$, $ZRP_{ij}$, $ZRP_{i3}$, $ZRP_{i4}$ illustrated in FIG. 4 require an adjusting change $FR_{ijk}$, since bits $B_{k-1}$ and $B_k$ in these zones have different values. In particular, the induction values in the right and left parts $PD_{k-1}$ and $PG_k$ of bits $B_k$ have the same polarity (i.e. positive in zones $ZRP_{i3}$ and $ZRP_{i4}$ and negative in zones $ZRP_{i0}$ and $ZRP_{i1}$).

From FIG. 5 are seen the advantages of the invention compared with the prior art. In FIG. 5a is illustrated a bit $B_k$ written in zones $ZRP_{i2}$, $ZRP_{i3}$ and $ZRP_{i4}$ in accordance with the prior art. In FIG. 5b is illustrated a bit $B_k$ written according to the invention; the bit in FIG. 5b has the same value as the bit in FIG. 5a and is assumed to occupy the same zones $ZRP_{i2}$ to $ZRP_{i4}$. In both of FIGS. 5a and 5b magnetic head T is shown in highly diagrammatic form. In FIG. 5a, head T is positioned on axis $Ax_3$ of track 3 so it straddles zones $ZRP_{i3}$ and $ZRP_{i4}$; in FIG. 5b head T is positioned on axis $Ax_2$ of track 2 so it straddles zones $ZRP_{i2}$ and $ZRP_{i3}$. Head T straddles the reference zones because of the shift in position of tracks in these zones compared to the track positions in the data sector, as illustrated in FIG. 2d. Head T must be accurately positioned, in non-straddling relation to the data track, and cannot be shifted to the reference track because of the high head rotational speed and short arcuate distant of reference sector $SAD_i$ to data sector $SDO_i$. In zones $ZRP_{i3}$ and $ZRP_{i4}$ bit $B_k$ is a 0 while in zone $ZRP_{i2}$ $B_k$ is a 1.

Reference is first made to FIG. 5a. When magnetic read/write head T is situated in straddling relation to the tracks of zones $ZRP_{i3}$ and $ZRP_{i4}$, on axis $Ax_3$, it derives signal $S_1$ having a waveform consisting of a single pulse of amplitude A, as the head passes position $P_3$. When head T is situated on axis $Ax_2$ it derives an uncertain signal $S_2$ having a waveform consisting of two pulses $S_{21}$ and $S_{22}$, having the same amplitude A' equal to A/2. In contrast, with the present invention as illustrated in FIG. 5b, when head T is on axis $Ax_3$, straddling zones $ZRP_{i3}$ and $ZRP_{i4}$, it derives a signal $S_3$, a waveform having a single pulse of amplitude A; when head T straddles zones $ZRP_{i2}$ and $ZRP_{i3}$, it derives a waveform including an uncertain signal $S_4$ having an amplitude of virtually zero. Signal $S_4$ is preceded by a pulse SFR because bit $B_k$ is preceded by an adjusting change $FR_{i2k}$.

As described above, in the prior art data writing method, the ever-present possibility of reading faults makes it possible for a signal of type $S_1$ to be converted into an uncertain signal of type $S_2$, which results in a substantial risk of error in determining the bit value. The high possibility of reading faults occurs because there are uncertainty allowances in reading of more than 25% on the amplitude of the read signals from the head T. In contrast, in the present invention the risk of a high amplitude $S_3$ signal being converted into a signal $S_4$ having a virtually zero amplitude is absolutely negligible. The data writing method of the invention thus enables the bit values to be determined with great accuracy.

Figure 6B:
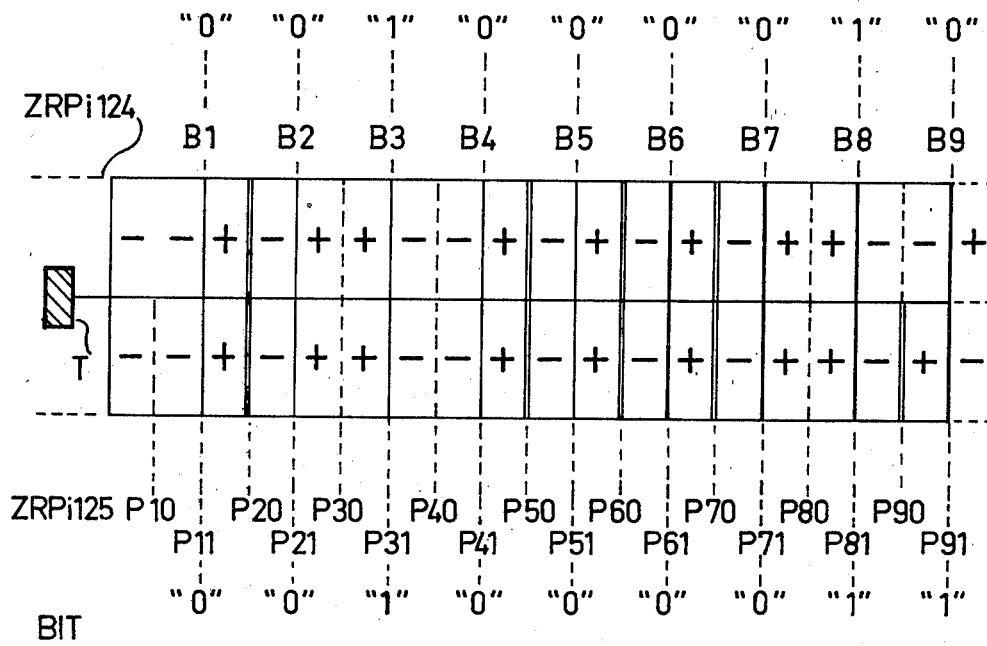
Figure 6C:
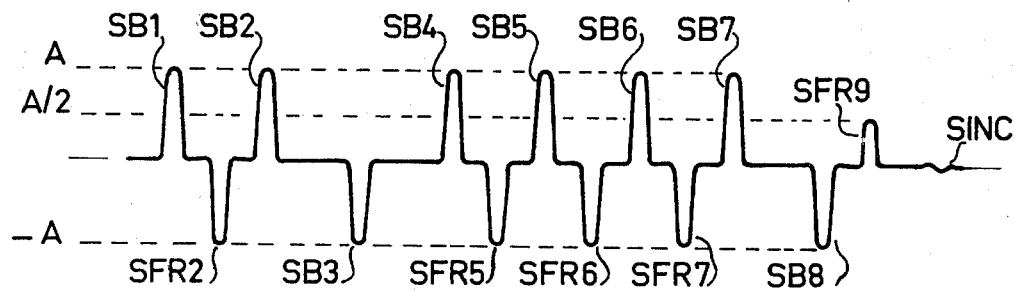

Reference is now made to FIG. 6 where the flux variations of adjacent addresses 124 and 125 of two tracks are illustrated. Addresses 124 and 125 are written in a reflected binary, "Gray" code, as described, for example, on pages 253 and 254 of a book by H. Soubies-Camy published by Editions Dunod in 1961. In FIG. 6a, the numbers 124 and 125, expressed in reflected binary code, are respectively written as 00100001 and 00100011. In FIG. 6b, are illustrated the magnetic variations on a magnetic disc of the bits for addresses 124 and 125 of reference zones $ZRP_{i124}$ and $ZRP_{i125}$; the bits forming the addresses being assumed to be written next to one another. FIG. 6c is an illustration of signal waveform derived by magnetic head T when it reads out the magnetic variations of FIG. 6b as a result of translating in a straddling position over zones $ZRP_{i124}$ and $ZRP_{i125}$.

From FIG. 6a, the essential characteristic of the Gray code is that two successive addresses differ by a change in only one bit between them. Thus, Gray code written addresses 124 and 125 differ in respect to only the last bit, which is equal to 0 for track 124 and 1 for track 125.

From FIG. 6b, the addresses of tracks 124 and 125 are written as 9 bits, $B_1$, $B_2$, . . . $B_9$, which respectively occupy positions $P_{1.1}$, $P_{2.1}$, $P_{3.1}$, $P_{4.1}$ . . . $P_{9.1}$. Adjusting changes, if provided, in bits $B_1$, $B_2$ . . . $B_9$ respectively occupy positions $P_{1.0}$, $P_{2.0}$, $P_{3.0}$ . . . $P_{9.0}$. The adjusting changes in those bits which have them are indicated by double lines. Each of zones $ZRP_{i124}$ and $ZRP_{i125}$ includes an elongated magnetic track, each of which includes a succession of longitudinally positioned magnetic flux variations that are selectively oppositely polarized. The elongated tracks of zones $ZRP_{i124}$ and $ZRP_{i125}$ are adjacent each other. The flux variations are in elemental areas of equal length along the length of each track so adjacent areas are in abutting relation. Adjacent areas in each track are susceptible to having either like or unlike magnetic flux polarizations so that a pair of adjacent areas having like polarizations do not actually appear as separate magnetic flux areas. The areas are arranged so there is always a transition of the magnetic flux polarity at predetermined equispaced positions $P_{1.1}, P_{2.1}, \ldots P_{9.1}$ along the length of each track; positions $P_{1.1}, P_{2.1} \ldots P_{9.1}$ define boundaries between a pair of the elemental areas. The transition direction at each boundary indicates the value of a binary bit, whereby, e.g., the negative to positive flux transitions at positions $P_{1.1}, P_{2.1}, P_{4.1}, P_{5.1}, P_{6.1}, P_{7.1}$, in track 125 of zone $ZRP_{i125}$ represent binary zero values and the positive to negative flux transitions at positions $P_{3.1}, P_{i.1}, P_{9.1}$ represent binary one values. The fluxes of the elemental areas between adjacent boundaries selectively have differing polarity variations to assure that like polarity transitions at each of boundaries $P_{1.1}, P_{2.1} \ldots P_{9.1}$ represent like binary bit values. Hence, the elemental areas having abutting edges at position $P_{30}$ both have positive fluxes to achieve the negative to positive transition at boundary $P_{21}$ (a binary zero); and the positive to negative transition at boundary $P_{31}$ (a binary one); in contrast the elemental areas abutting position $P_{20}$ have positive and negative values to achieve the negative to positive transitions (binary zero) at boundaries $P_{11}$ and $P_{21}$. The positive to negative transition at position $P_{20}$ is referred to as an adjusting change. Similarly, the positive to negative transition at position $P_{50}$, to achieve the negative to positive transitions at boundaries $P_{41}$ and $P_{51}$ is an adjusting change. Common to addresses 124 and 125 are four adjusting changes which occupy positions $P_{2.0}, P_{5.0}, P_{6.0}, P_{7.0}$. Address 125 contains an extra adjusting change situated in position $P_{9.0}$.

From FIG. 6c, the signals derived by head T, which is straddling reference zones $ZRP_{i124}$ and $ZRP_{i125}$, includes positive bit pulses $SB_4$–$SB_7$ and negative bit pulses $SB_1, SB_2, SB_3$, and $SB_8$, all of amplitude A, which are derived at the bit indicating transitions in bits $B_1$–$B_9$ for the addresses read from zones $ZRP_{i124}$ and $ZRP_{i125}$. The signal read by head T also includes negative adjusting change pulses $SFR_2, SFR_5, SFR_6$ and $SFR_7$ having amplitude A and positive adjusting change pulse $SFR_9$ having amplitude A/2; pulses $SFR_2, SFR_5, SFR_6, SFR_7, SFR_8$ and $SFR_9$ respectively correspond to the adjusting changes situated in positions $P_{2.0}, P_{5.0}, P_{6.0}, P_{7.0}, P_{8.0}, P_{9.0}$. The waveform derived from head T also includes a very low amplitude uncertainty pulse SINC. Obviously, the risk of confusing the pulses of amplitude A and −A with the uncertainty pulse SINC is virtually negligible. Hence, there is a high probability of accurately determining the value of bits $B_1$ to $B_8$, but a low probability of accurately determining bit $B_9$ corresponding to the uncertainty signal SINC. The low probability for one Gray code bit can be tolerated in many instances, particularly for address reading.

Figure 7:
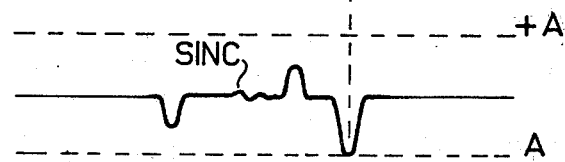
FIG. 7 is another preferred method of writing data according to the invention, wherein fault indicating data are written in a reference zone.

In FIG. 7 is shown a second preferred embodiment of the invention wherein a fault-indicating data bit $VALID_{ij}$ and a parity bit $PARITY_{ij}$ are written in reference zone $ZRP_{ij}$. Fault indicating bit $VALID_{ij}$ indicates whether or not a track j in sector $S_{i+1}$ (FIG. 2) contains writing faults, while parity bit $PARITY_{ij}$ indicates whether the number of binary one bits in reference zone $ZRP_{ij}$ is odd or even.

For the sake of simplicity, in FIG. 7 are shown the least significant adddress bit ($B_9$), the fault indicating bit and parity bit in six reference zones $ZRP_{i(j-4)}$ to $ZRP_{i(j+1)}$. Bits $VALID_{ij}$ and $PARITY_{ij}$ are preferably positioned at one end of a reference zone $ZRP_{ij}$ so they are read last by head T when the disc passes before the head. The last address bit $B_9$ for track j occupies position $P_{9.1}$ adjacent bit $VALID_{ij}$. Boundaries $Ax_{j-4}, Ax_{j-3}, Ax_{j-2}, Ax_{j-1}, Ax_j$ are provided between reference zones $ZRP_{i(j-4)}$ to $ZRP_{i(j+1)}$. Bit $VALID_{ij}$ occupies a position $V_1$ and has an adjusting change at position $V_0$ which enables allowance to be made for the value of bit $B_9$. Bit $PARITY_{ij}$ occupies position $PA_1$ and has an adjusting change at position $PA_0$ which enables allowance to be made for the value of $VALID_{ij}$. In FIG. 7 the + and − signs indicate the sense of magnetic induction between the positions occupied by each of the bits $B_9$, $VALID_{ij}$, and $PARITY_{ij}$ in zones $ZRP_{i(j-4)}$ to $ZRP_{i(J+1)}$.

Fault data bit $VALID_{ij}$ is coded as follows:

(1) if the magnetization sense change corresponding to bit $VALID_{ij}$ is identical in two adjoining reference zones $ZRP_{ij}$ and $ZRP_{i(j+1)}$, the track in sector $S_{i+1}$ (FIG. 2) having an axis that defines the boundary between zones $ZRP_{ij}$ and $ZRP_{i(j+1)}$ does not contain a fault, whereby the signal read by head T is a pulse of amplitude A;

(2) if the magnetization sense change is different in two adjoining reference zones $ZRP_{ij}$ and $ZRP_{i(j+1)}$, the track in sector $S_{i+1}$ having an axis that defines the boundary between zones $ZRP_{ij}$ and $ZRP_{i(j+1)}$ does contain faults, whereby the signal read by head T is an uncertainty signal of virtually zero amplitude.

Thus, if the fault data bits of FIG. 7 are considered for zones $ZRP_{ij}$ and $ZRP_{i(j+1)}$, there is at position $V_1$ a change from negative induction to positive induction (a positive change of sense), which means that track j in Sector $S_{i+1}$ contains no faults. The same is true of zones $ZRP_{i(j-1)}$ and $ZRP_{ij}$, whereby track (j−1) in Sector $S_{i+1}$ contains no faults. In zones $ZRP_{i(j-3)}$ and $ZRP_{i(j-2)}$ there are at position $V_1$ changes from positive magnetic induction to negative magnetic induction, which means that track (j−3) in sector $S_{i+1}$ contains no faults. Similarly, track (j−4) in sector $S_{i+1}$ contains no faults. However, at position $V_1$ in reference zones $ZRP_{i(j-2)}$ and $ZRP_{i(j-1)}$ the changes in magnetization sense differ whereby (j−2) in sector $S_{i+1}$ does contain faults.

The coding of bit $PARITY_{ij}$ at position $PA_1$ is similar to that of bit $VALID_{ij}$. If the magnetization sense change at position $PA_1$, corresponding to bit $PARITY_{kj}$, is the same in two adjoining reference zones $ZRP_{ij}$ and $ZRP_{i(j+1)}$, the bit $PARITY_{ij}$ is equal to 1, which means that the number of binary 1 bits in reference zone $ZRP_i$ that corresponds to the track having an axis on the boundary between the zones $ZRP_i$ and $ZFP_{i(j+1)}$ is even. If, however, the magnetization sense changes in the zones $ZRP_i$ and $ZRP_{i(j+1)}$ differ, bit $PARITY_{ij}$ is equal to 0 which means that the number of binary one bits in the reference zone $ZRP_{ij}$ corresponding to the track having an axis on the boundary between the two zones is odd.

In reference zones $ZRP_{ij}$ and $ZRP_{i(j+1)}$ of FIG. 7, the like changes in magnetization sense at position $PA_1$, corresponding to the bit $PARITY_{ij}$, for both of the zones indicate that the bit $PARITY_{ij}$ is equal to 1, which means that the number of binary one bits in reference zone $ZRP_{ij}$ is even. The same is true for reference zones $ZRP_{i(j-1)}$ and $ZRP_{i(j-2)}$, whereby the number of binary one bits in reference zone $ZRP_{i(j-2)}$ is even. The number of binary one bits in reference zone $ZRP_{i(j-4)}$ is indicated as being even because magnetization sense changes at position $PA_1$ for bit $PARITY_{ij}$ in the two zones $ZRP_{i(j-3)}$ and $ZRP_{i(j-4)}$ are the same.

However, in zones $ZRP_{ij}$ and $ZRP_{i(j-1)}$ the magnetization sense changes at position $PA_1$ differ which means that bit $PARITY_{ij}$ is equal to 0 and there is an odd number of binary zeros in zone $ZRP_{ij}$. Similarly, there is an odd number of binary one bits in the reference zone $ZRP_{i(j-3)}$, as indicated by the differing magnetization sense changes of bit PARITY in reference zones $ZRP_{i(j-2)}$ and $ZRP_{i(j-3)}$.

The bit $VALID_{ij}$ is preceded by an adjusting change in reference zones $ZRP_{i(j+1)}$, $ZRP_{ij}$, $ZRP_{i(j-2)}$. The bit $PARITY_{ij}$ is preceded by a plus to minus adjusting change in zones $ZRP_{i(j+1)}$ and $ZRP_{ij}$, and a minus to plus adjusting change in zone $ZRP_{i(j-2)}$.

Also shown in FIG. 7 are the output signals of head T when it is straddling the zones $ZRP_{i(j-1)}$ and $ZRP_{i(j-2)}$, that is situated on the axis $Ax_{(j-3)}$. The output signal of head T corresponding to bit $VALID_{ij}$ is an uncertainty signal SINC of zero amplitude, whereas the signal corresponding to the bit $PARITY_{ij}$ is a signal of amplitude $-A$.

While there have been described and illustrated several specific embodiments of the invention, it will be clear that variations in the details of the embodiments specifically illustrated and described may be made without departing from the true spirit and scope of the invention as defined in the appended claims.

I claim:

1. A magnetic recording medium in which data are written in binary code and carried by a plurality of tracks, the medium containing at least one sub-set of data items each of which is defined by a magnetization sense change and disposed along adjoining tracks, the items in the sub-set being read by at least one magnetic transducer which straddles two adjoining tracks, the improved medium comprising a magnetization sense change representing each data item in the sub-set being positioned to always occupy the same position in any track, two identically located magnetization sense changes of two adjoining tracks representing two data items of the two adjoining tracks defining information having a first significance, two different magnetization sense changes of two adjoining tracks representing two data items of the two adjoining tracks defining information having a second significance.

2. The medium of claim 1, wherein the magnetic recording medium is a magnetic disc with the data contained on each face of the disc distributed over equal and adjacent sectors of a circle.

3. The medium of claim 2, wherein each sector is divided into two unequal areas, one of said areas being a larger area and a second of said areas being a smaller area, the smaller area containing a plurality of reference zones equal in number to the tracks, each track being associated with a single zone, the reference zone in each sector as a whole containing the sub-set of data items whereby the head straddles the tracks of adjoining tracks of a pair of reference zones but does not normally straddle adjoining tracks of the larger zone.

4. The medium of claim 3, wherein the data contained in each reference zone in a sector comprises data items for locating the tracks, said data items being the addresses and data required to control the position of the magnetic transducer associated with the face carrying the sector above the tracks, said data items indicating whether or not the tracks contain faults.

5. A magnetic storage medium for binary bits adapted to be read by a magnetic head that moves at approximately constant speed relative to the medium, comprising a plurality of elongated adjacent magnetic tracks, each track including a succession of longitudinally positioned polarized magnetic flux variations arranged in elemental areas of equal length along the length of each track, adjacent ones of the areas susceptible to having like and unlike magnetic flux polarizations, said head and tracks adapted to be positioned so the head straddles a pair of the tracks and is simultaneously responsive to flux variations in the pair of straddled tracks, the head and track being moved relative to each other so the head is responsive to successive flux variations as time progresses, the areas being arranged so there is always a magnetic flux polarization transition at predetermined equi-spaced positions along the track length at a boundary between a pair of elemental areas, said transitions in adjacent tracks being aligned, the direction of the transition at each boundary indicating the value of a binary bit, the fluxes of the elemental areas between adjacent boundaries selectively having different polarity variations to assure that like polarity transitions at each boundary represent like binary bit values.

6. The medium of claim 5 wherein there are first and second areas between pairs of adjacent first and second boundaries, the first and second areas having edges at the first and second boundaries and flux polarities determined by stored binary values indicated by the transitions at the first and second boundaries, the first and second areas having like flux polarities if the binary bit values defined by the transitions at the first and second boundaries are alike.

7. The medium of claim 5, wherein the bits of a track are in a reference zone and have transitions representing the address of the track on which the bits appear.

8. The medium of claim 7, wherein the reference zone includes, for each track, fault indicating and parity bits for the track address indicated by the address bits, the value of said fault indicating and parity bits being indicated by the directions of the transitions between two pairs of the elemental areas, one elemental area for the fault indicating transition having an edge abutting against an edge of one elemental area for the parity indicating transition, the other elemental area for one of the fault indicating or parity transition having an edge abutting against an edge of one elemental area of an address bit in the reference zone.

9. A magnetic storage medium for binary bits adapted to be read by a magnetic head that moves at approximately constant speed relative to the medium comprising a plurality of elongated adjacent magnetic tracks, each track including a succession of longitudinally positioned magnetic flux changes equi-spaced along the track at predetermined positions, said heads and tracks adapted to be positioned so the head straddles a pair of the tracks and is simultaneously responsive to flux variations in the pair of straddled tracks, the head and tracks being moved relative to each other so the head is responsive to successive flux variations as time progresses, the flux change direction at each position of adjacent tracks being aligned and indicating the value of a binary bit, and a change in flux direction between selected adjacent predetermined positions so like flux change directions at each predetermined position represent binary bits having the same value.

10. A magnetic disc storage medium comprising a plurality of substantially concentric tracks, each of said tracks including a data area and a reference zone adjacent and longitudinally spaced from the data area, the reference zone of each track being radially displaced from the data area of the track by approximately one half the radial width of a track, whereby a center line of a data area track is aligned with a longitudinal axis between reference zones in a pair of abutting tracks for the reference zones, a succession of longitudinally positioned magnetic flux changes equi-spaced along each reference zone track length at predetermined positions so reference zone changes of all tracks are angularly aligned, the flux change direction at each position indicating a binary value, and a change in flux direction between selected adjacent predetermined ones of said positions so like flux change directions at each predetermined position represent like binary bits.

11. The medium of claim 10 wherein the reference zone for each track includes first transitions at a first group of the predetermined positions, said first transitions indicating binary values for the track address, fault indicating second transitions at a second of the predetermined positions, said second transitions indicating faulty data in the data area of the track, and parity indicating third transitions at a third of the predetermined positions, said third transitions indicating the value of a parity bit for the address of the track, the fault indicating transitions having a center line aligned with the longitudinal axis between the abutting reference zones, first and second values for the fault being respective indicated by a difference in and by no difference in magnetic polarities of elemental areas adjacent the second of the predetermined positions in the abutting reference zones, first and second parity bit values for the address of the reference zone being indicated by the sense of magnetic bit transitions in the third of the predetermined positions.

12. The medium of claim 10 wherein the reference zone for each track includes first transitions at a first group of the predetermined positions, said first transitions indicating binary values for the track address, and parity indicating second transitions at a second of the predetermined positions, said second transitions indicating the value of a parity bit for the address of the track, first and second parity bit values for the address of the reference zone being indicated by the sense of magnetic bit transitions in the second of the predetermined positions.

13. The medium of claim 10 wherein the reference zone for each track includes fault indicating transitions at one of the predetermined positions, said fault indicating transitions indicating faulty data in the data area of the track, the fault indicating transitions having a center line aligned with the longitudinal axis between the abutting reference zones, first and second values for the fault being respectively indicated by a difference in and by no difference in magnetic polarities of elemental areas adjacent the one predetermined position in the abutting reference zones.

* * * * *